Jan. 24, 1967   A. P. DISTELKAMP ET AL   3,300,320
PROCESS OF PRODUCING AND USING FLAVORING COMPONENTS
OF CITRUS FRUIT JUICES AND PRODUCT
Filed Nov. 19, 1962
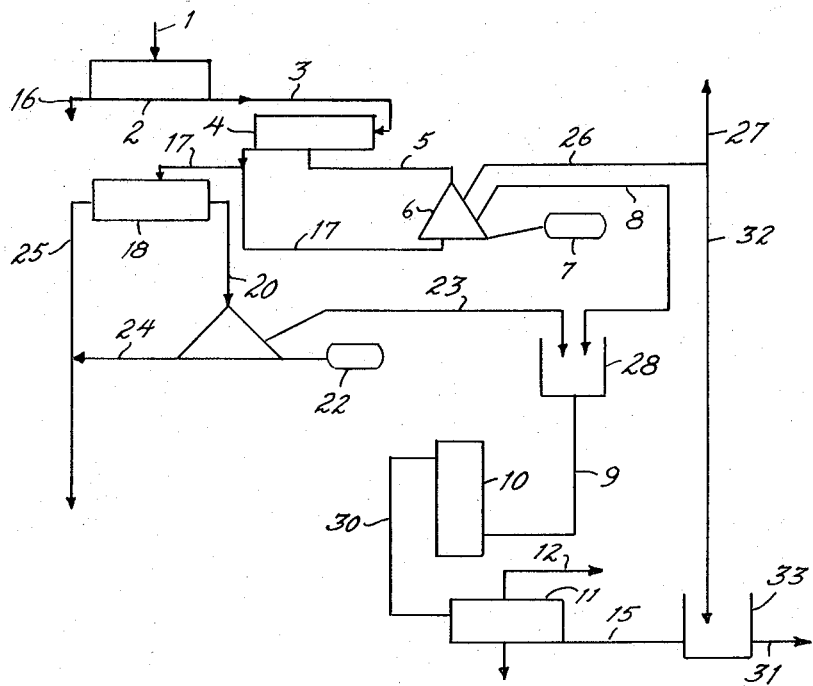
INVENTORS.
ADOLF P. DISTELKAMP
OMER R. McDUFF

United States Patent Office 3,300,320
Patented Jan. 24, 1967

3,300,320
PROCESS OF PRODUCING AND USING FLAVORING COMPONENTS OF CITRUS FRUIT JUICES AND PRODUCT
Adolf P. Distelkamp, 4524 S. Lois Ave., Tampa, Fla. 33611, and Omer R. McDuff, 2297 11th St. NW., Winter Haven, Fla. 33880
Filed Nov. 19, 1962, Ser. No. 238,694
9 Claims. (Cl. 99—205)

The present invention relates to a simple and highly effective process of producing fruit juices of excellent taste and flavor and more particularly to a process of recovering the essential oils and/or flavor carriers from fruit, especially from oranges, lemons, and grapefruits, and or producing fruit juices, concentrates, and or other products with a high degree of their natural fruit flavor.

Citrus fruit juices are produced, for instance, by separating the juice from the peel by means of so-called extractors. The resulting fruit juice extract contains a large amount of fruit pulp, namely about 20% to about 35%, by volume. The pulp content of the juice is further reduced to an amount of about 8–15%, by volume, by so-called finishers or shaker screens. The resulting freshly finished juice contains a certain amount of peel oil, cell oil, and other flavor carriers, such as the so-called essences. The finished juice of about 12° Brix is stabilized by a heat treatment and then either packed as single strength juice or chilled juice or is concentrated in evaporators of various designs up to 75° Brix. During such a heat treatment and concentration the above-mentioned flavor carriers are partly destroyed and partly lost as vapors. Various methods have been used heretofore to add flavor back to the concentrate prior to packaging. The principal known methods are:

(1) Cut back juice, i.e. finished juice of approximately 12° Brix from good quality citrus fruit and a certain amount of peel oil recovered from the peel of the fruit are added back to the evaporator pump-out, i.e. the concentrate obtained from the evaporator, which without such an addition, when reconstituted in water to the original 12° Brix, has a flat flavor. Addition of said cut back juice and a certain amount of peel oil has a certain flavor-improving effect.

(2) So-called essence, i.e. the non-oily part recovered from the condensate of the evaporator is concentrated and added back to the evaporator pump out, either together with cut back juice and peel oil, or together with peel oil only, or just by itself. Essence addition has also a certain taste and flavor-improving effect.

(3) Instead of a cut back juice, i.e. the single strength finished juice of approximately 12° Brix from good quality fruit, a freeze concentrate, i.e. such a single strength juice which has been concentrated to about 30° Brix by removal of water by freezing, is added back to the evaporator pump out either with or without additional peel oil.

All these known processes of producing a citrus fruit juice concentrate which, on reconstitution with water to its original concentrate should have substantially the same flavor and taste as fresh juice, are expensive, complicated, and only partly successful.

It is one object of the present invention to overcome the above mentioned disadvantages and to provide a new and simple process of producing citrus fruit juices or concentrates with substantially the natural taste and flavor.

Another object of the present invention is to separate from the fruit taste and flavor components in the form of an emulsion which can be stored and added as required to citrus fruit juices, concentrates, and/or other products to improve their flavor and taste.

A further object of the present invention is to provide a preparation containing the taste and flavor producing components of citrus fruits which can be used as such for the improvement of taste and flavor of beverages, fruit salads and other food preparations, perfumes, soaps, and other products.

Other objects of the present invention and advantageous features thereof will become apparent as the description proceeds.

In principle the process according to the present invention consists in subjecting the fresh, finished juice prior to any intense heat-treatment to the action of a centrifugal force so as to produce a light phase consisting of an emulsion enriched with taste and flavor components and a heavy phase consisting of juice reduced in taste and flavor components. It has been found that, when proceeding in this manner according to the present invention, it is possible to recover an emulsion which contains a substantial portion of all the oil and/or flavoring substances present in the fruit.

High speed liquid-liquid-centrifuges of the solid bowl desludger or nozzle type have proved to be especially suitable for carrying out the process according to the present invention. The discharge for both the lighter emulsion phase and the heavier juice phase is preferably fully enclosed.

If open centrifuges are used, they should be operated under a nitrogen blanket in order to prevent oxidative changes in the juice and/or the emulsion.

After centrifuging, the partly deoiled juice is further processed in the conventional manner. The flavor carrying emulsion phase obtained on centrifuging is preferably chilled immediately after centrifuging and is stored at reduced temperatures. Cold stabilization of the emulsion before further processing, for instance, by radiation pasteurization might be of advantage.

The resulting emulsion is either added immediately or after a certain storage time back to the finished juice or the concentrate subsequently to any heat treatment thereof, but ahead of the packaging operation. Thereby, substantially the original natural flavor and taste are imparted to the juice or concentrate. Depending on flavor and quality requirements, it is possible to blend all or only part of the initially present amount of emulsion back into the juice or concentrate.

It is also possible to further refine the emulsion, for instance, by breaking the emulsion, for instance, by heating and separation of the layers so as to produce a pure oil. The emulsion or oil may further be processed by distillation, folding, and/or degasifying in order to remove any off-flavors which might be present therein. Folding is effected by fractional distillation while degasifying may be achieved by spraying the emulsion or the essence obtained therefrom into a vacuum chamber. Subsequent homogenization of the emulsion may also be of advantage in order to produce a more uniform flavor additive. The emulsion may be freeze concentrated because, thereby, the amount of concentrated flavoring agent to be added to the fruit juice or concentrate is reduced and the stability and storability is increased. If necessary, all these methods of further processing the emulsion may be combined with each other to meet special specifications.

The process according to the present invention and the addition of the light emulsion phase either as such or in processed and/or concentrated form to the citrus fruit juice or concentrate has many advantages over the heretofore known methods. For instance, the finished juice or concentrate has a better and more natural flavor than is obtained by the prior art methods. Addition of considerable amounts of cut back juice resulting in the necessity for higher evaporator pump out concentration is partly or completely eliminated. Thus the evaporator pump out can be of low concentration and, as a result thereof, evaporator capacity and efficiency can be improved.

The light emulsion phase can be much more readily blended with the finished juice or concentrate than straight peel oil and/or essence. It is also possible to store such an emulsion recovered from top quality fruit and to use it to improve the flavor of chilled juice, single strength juice, and concentrate from lower quality citrus fruit.

Further details of the present invention will be apparent from the following description with reference to the accompanying diagrammatic drawing illustrating a suitable way of carrying out the process.

Referring to the drawing the citrus fruit 1 is supplied to extractor 2 where the peel is separated from the juice. The peel is discharged at 16 for recovering the oil therefrom while the juice is passed through pipe 3 to finisher or shaker screen 4. The finished juice from said finisher is conducted through pipe 5 to a liquid-liquid separating automatic desludging type centrifuge 6 where it is separated into the light phase, i.e. the flavor carrying emulsion which is discharged through pipe 26, and the heavy partly deoiled juice phase which is discharged through pipe 8. Desludging is intermittently effected and controlled by programming device 7. The deoiled juice is then conducted through holding tank 28 and pipe 9 into pasteurizer 10 and through pipe 30 into evaporator 11. The concentrated juice is discharged through pipe 15 into blending device 33 where the required amount of flavoring emulsion supplied through pipe 32 is admixed with the pump out. The concentrate is conducted from said device 33 through pipe 31 to the packaging operation or for further processing. The condensate of the evaporator 11 is discharged through pipe 12.

The intermittently desludged pulp from centrifuge 6 is discharged through pipe 17 for further soluble solids recovery or other disposition.

All or part of the light phase flavor carrying emulsion discharged from centrifuge 6 through pipe 26 may be conducted through pipe 27 to storage tanks or to freezers, refrigerators, or other apparatus for further processing.

The following example serves to illustrate the present invention without, however, limiting the same thereto.

In this example there is only described the recovery of the emulsion and its subsequent use while the preparation of the finished juice and further working up of the juice to a concentrate are not specifically disclosed inasmuch as these steps are carried out according to methods known to the art.

*Example*

3200 gallons of a finished citrus fruit, i.e. orange juice of 10.3° Brix having 2% light pulp and 12% heavy pulp (determined by standard spin test) and 0.034% oil (determined by standard quick oil method) was introduced into centrifuge 6 of the automatic desludger type. The juice effluent or heavy phase contained 10% pulp and 0.015% oil. The light phase or emulsion, consisting of about 50 gallons, contained 1.2% oil and only a trace of pulp.

The emulsion was stored for several weeks at ordinary refrigerator temperatures (30–40° F.) and still retained its characteristic fresh and fruity aroma.

This emulsion is added to the evaporator pump out obtained from the centrifuged juice in an amount equivalent to the amount of peel oil ordinarily added for flavor improvement. The taste of the resulting juice after reconstitution is excellent. Even addition of an excess of the emulsion does not impart to the reconstituted juice the usual bitter taste associated with high peel oil levels. This is in contrast to the addition of excess peel oil to concentrated juice because it creates a rather bitter taste. It is also very difficult to determine the exact amount of peel oil to be added to a juice because a slight excess might produce a bitter taste, while, in contrast thereto, no such difficulties arise when using the emulsion according to the present invention.

Of course, many changes and variations in the starting fruit juices and in their production, in the centrifuges used and the conditions of centrifuging, in the manner in which the resulting emulsion is recovered and further used and processed, and the like may be made by those skilled in the art in accordance with the principles set forth herein and in the claims annexed thereto.

We claim:
1. Process of separating and concentrating the aromatic and flavoring components of citrus fruit juices, comprising subjecting fresh, finished, citrus fruit juice, prior to any intense heat treatment, to a centrifugal separating step and thereby concentrating significant quantities of its aromatic and flavoring components in a minor part of the starting volume in the form of an aqueous emulsion enriched in but containing at most about 15% of oil, and separating said emulsion as a relatively light phase from the at least partially deoiled heavier juice phase.

2. Process of concentrating the aromatic and flavoring components of citrus fruit juices, comprising subjecting fresh, finished citrus fruit juice of about 10° to 12° Brix and less than 1% oil, prior to any intense heat treatment, in the absence of atmospheric oxygen, to a centrifugal separation into relatively light and heavy phases, the lighter phase being enriched in aromatic and flavoring components and being in the form of an aqueous emulsion, said emulsion containing more than 1% oil and at most about 15% of oil, and collecting said emulsion as the lighter phase apart from the least partially deoiled heavier juice phase.

3. The process according to claim 2, wherein the fresh finished citrus fruit juice is subjected to the action of a centrifugal force in a fully enclosed space effective to exclude atmospheric oxygen.

4. The process according to claim 2, wherein the fresh finished citrus fruit juice is subjected to the action of a centrifugal force while in the atmosphere of an inert, non-oxidizing gas.

5. The process according to claim 4, wherein the inert, non-oxidizing gas is nitrogen.

6. Process of producing orange juice concentrates of improved taste and flavor, comprising centrifugally separating fresh finished orange juice of about 10° Brix with pulp content of about 8% to 15% and oil content of a few hundredths percent into a relatively light aqueous emulsion phase containing from about 1% to 15% oil and at most a trace of pulp and enriched in taste and flavoring ingredients of such juice, separating said lighter emulsion phase from the at least partially deoiled heavier juice phase, and collecting said lighter emulsion phase having characteristic fresh orange juice flavor and taste.

7. The process according to claim 1, including the additional step of freezing the lighter emulsion phase.

8. The process according to claim 1, wherein the oil content of the centrifuged heavier juice phase is reduced by about 50%.

9. Process of producing a citrus fruit-flavor-restorative composition comprising subjecting fresh, finished citrus fruit juice of about 10° to 12° Brix to a centrifugal liquid-liquid separation, discharging the lighter phase therefrom as an aqueous emulsion having a volume on the order of about 1% of the volume of the finished juice before such separation and having a content of about 1% to 15% oil and being enriched in juice-soluble and oil-soluble flavoring ingredients as compared with their content in the fresh, finished juice.

References Cited by the Examiner

UNITED STATES PATENTS

| | | | |
|---|---|---|---|
| 950,950 | 3/1910 | Oehme | 99—205 |
| 1,885,401 | 11/1932 | Alexander | 99—205 |
| 2,190,991 | 2/1940 | Meinzer | 99—105 |
| 2,381,732 | 8/1945 | Finley | 99—105 |
| 2,423,747 | 7/1947 | Zahm | 99—205 |
| 2,588,337 | 3/1952 | Sperti | 99—205 |
| 2,641,550 | 6/1953 | Dykstra et al. | 99—205 |

OTHER REFERENCES

Morgan et al., "Studies on the Recovery of Essence From Florida Orange Juices," "Food Technology," 1953, Vol. VII, No. 8, pp. 332 to 336.

A. LOUIS MONACELL, *Primary Examiner.*

R. S. AULL, *Assistant Examiner.*